R. F. TOOPE.
INCUBATOR.
APPLICATION FILED APR. 3, 1911.
1,057,301.
Patented Mar. 25, 1913.
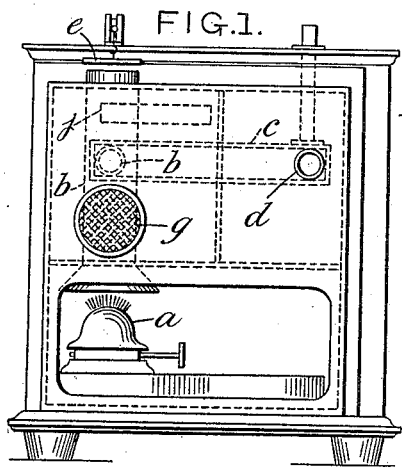
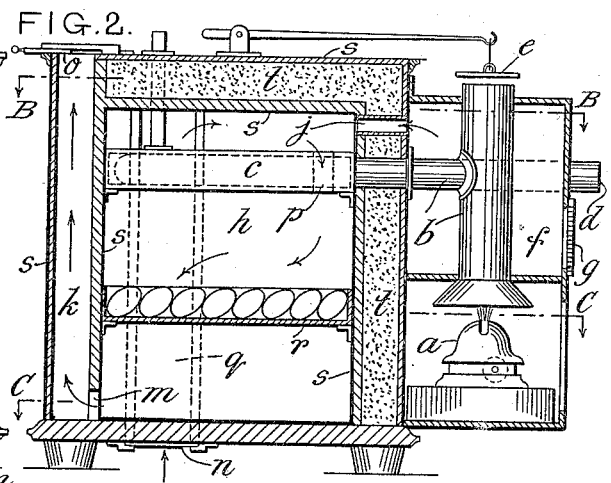
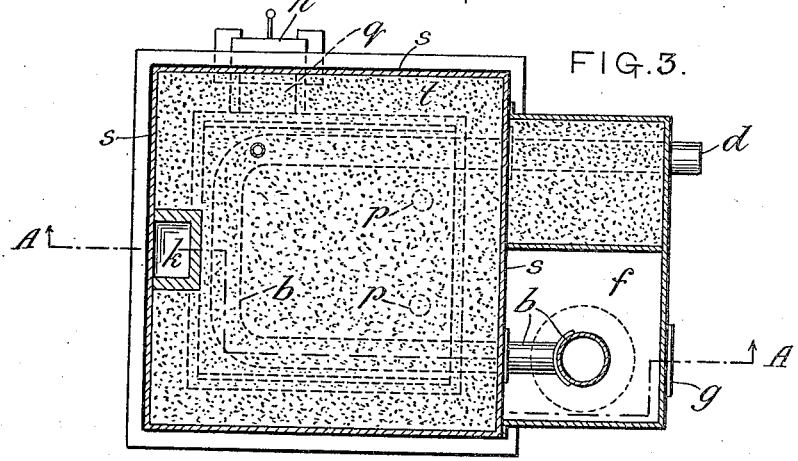
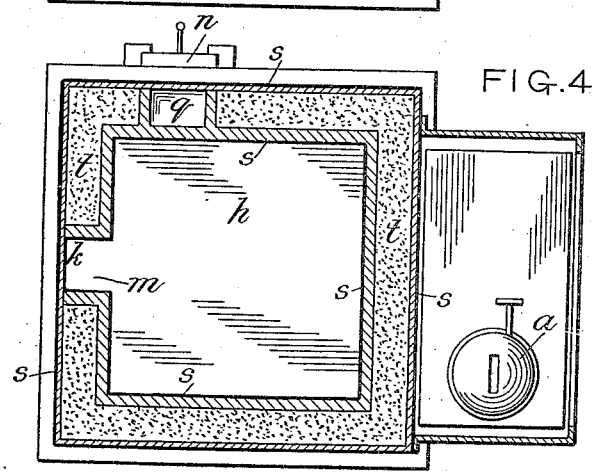
WITNESSES
J. P. Davis
J. D. Rollhaus
INVENTOR
Robert Frank Toope
BY Munn & Co
ATTORNEYS

UNITED STATES PATENT OFFICE.

ROBERT FRANK TOOPE, OF LONDON, ENGLAND.

INCUBATOR.

1,057,301.  Specification of Letters Patent.  Patented Mar. 25, 1913.

Application filed April 3, 1911. Serial No. 618,598.

*To all whom it may concern:*

Be it known that I, ROBERT FRANK TOOPE, a subject of the King of Great Britain, and resident of 1 Stepney Square, Stepney, London, E., England, have invented certain new and useful Improvements in Incubators, of which the following is a specification.

Heretofore incubators have generally been constructed of wood which, owing to the apparatus being constantly subjected to high temperatures, inevitably becomes exceedingly dry and is therefore liable to take fire if exposed, accidentally or otherwise, to direct contact with the flame or a spark from the heating apparatus. Moreover, if the apparatus has been in use for some considerable time, there is frequently a danger of the spontaneous ignition of the structure.

This invention has for its primary object to obviate the above mentioned danger and to provide an incubator which is not only incombustible but exceedingly durable and proof against the attack of vermin, rot, or similar causes of deterioration.

A further object of the invention is to increase the efficiency of the apparatus by the employment in the construction thereof, of material well adapted to resist the passage therethrough of heat by conduction.

To this end the incubator is constructed practically wholly of asbestos, the side, top and bottom walls being composed of sheets of that material secured in a frame or frames of metal by means of bolts, screws, or the like, and coated if desired, with paint or similar compound. The door whereby access may be had to the interior of the incubator is, however, of a metal sheet either hinged to the front wall of the incubator or mounted to slide in guides or in any other suitable manner and provided with an inspection window preferably glazed with two thicknesses of glass separated a short distance from one another in order the better to protect the interior from the influence of the outer atmosphere.

Referring to the accompanying drawings which illustrate diagrammatically one form of incubator made in accordance with this invention, Figure 1 is an end view. Fig. 2 is a sectional elevation on the line A—A Fig. 3, and Figs. 3 and 4 are sectional plans on the lines B—B and C—C respectively of Fig. 2.

The apparatus is heated by a lamp $a$, the flue $b$ of which after passing through a water tank $c$ has its exit at $d$. Those parts of the heating apparatus which come in contact with the flame of the lamp $a$ are preferably made of copper, and the draft through the flue $b$ is regulated by a damper $e$ automatically operated according to the temperature in the incubator by any well known means. The lamp $a$ is surrounded by an air chamber $f$ into which air is drawn through the inlet $g$ containing filtering material. Before entering the egg chamber $h$ of the incubator through the opening $j$ the air is thoroughly heated in the chamber $f$ by contact with the flue $b$.

A current of air is induced through the chamber $h$ and through an air shaft $k$ at the side and opening at $m$ at the foot thereof, by heating the air in the upper part of said shaft, and $o$ is a damper for regulating the current therethrough. It will be seen from Fig. 2 of the drawings that the opening $j$ is above the tank $c$ and apertures $p$ $p$ are formed through said tank for the passage of the air.

In addition to the regulated supply of heated and dried air thus drawn through the incubator, an independent supply of air is also drawn in from below the level thereof through a shaft $q$ regulated by a damper $n$ at the bottom of the incubator and leading to the space above the tank $c$. Here the cold and moist air is heated by contact with said tank and passing through the apertures $p$ $p$ it mingles with the supply of heated and dried air and then passes through the chamber $h$ in which the eggs are arranged in a tray $r$ as is usual. The chamber $h$ is also heated by the radiation of heat from the tank $c$. In this manner the efficiency and economy of the incubator are increased inasmuch as a regulable supply of heated air is maintained as well as a sufficient supply of moisture. Thorough ventilation is thus insured and the risk of bad hatches is greatly reduced.

The incubation chamber $h$ is preferably inclosed in double walls $s$ $s$ of asbestos, the intermural spaces being packed with slag wool $t$ or similar incombustible material which is a bad conductor of heat, and if desired the whole may be inclosed in an outer protective casing of sheet metal such as planished steel or the like, or the asbestos walls may be provided with an inner and an outer protective covering of the same material.

It will be obvious that an incubator constructed almost wholly of asbestos or similar material well adapted to resist the passage by conduction of the heat derived from the heating apparatus, and which, unlike wood is a non-absorbent of heat, enables said heat to be utilized without waste and an even temperature to be maintained within the incubator irrespective of the inevitable variations in the temperature of the surrounding atmosphere; and further, an incubator so constructed will be rendered absolutely fireproof and is exceedingly durable and not exposed to deterioration from rot, or the attacks of vermin.

Claim:

An incubator having an egg chamber therein and an air mixing chamber above said egg chamber, an air heating chamber communicating with said mixing chamber for delivering heated and dried air thereto, and having an air inlet, an air inlet communicating, through the base of the incubator, with said mixing chamber, whereby to supply relatively cold and undried air, a water tank between said egg chamber and said mixing chamber and having an opening therethrough for the passage of the mixed air into the egg chamber, a heater disposed within the air chamber and having its smoke pipe extended through, and adapted to heat, the water tank, and a damper controlled outlet for the mixed air whereby to control the volume thereof which passes through the egg chamber.

ROBERT FRANK TOOPE.

Witnesses:
A. D. JAMESON,
W. DAVIES.

Copies of this patent may be obtained for five cents each, by addressing the "Commissioner of Patents, Washington, D. C."